United States Patent [19]
Bartlett

[11] 3,925,974
[45] Dec. 16, 1975

[54] HAYSTACKER

[76] Inventor: Morton P. Bartlett, 700 North Main, Chadron, Nebr. 69337

[22] Filed: Mar. 26, 1974

[21] Appl. No.: 455,038

[52] U.S. Cl. ................................................ 56/346
[51] Int. Cl.² ...................................... A01D 87/00
[58] Field of Search ...................... 56/341, 344–350

[56] References Cited
UNITED STATES PATENTS
| | | | |
|---|---|---|---|
| 3,538,696 | 11/1970 | Carson | 56/350 |
| 3,691,741 | 9/1972 | White et al. | 56/344 |
| 3,720,052 | 3/1973 | Anderson | 56/346 |

FOREIGN PATENTS OR APPLICATIONS
| | | | |
|---|---|---|---|
| 1,245,198 | 7/1967 | Germany | 56/344 |

*Primary Examiner*—Russel R. Kinsey
*Attorney, Agent, or Firm*—Clarence A. O'Brien; Harvey B. Jacobson

[57] ABSTRACT

A haystacker having an enclosure into which hay is fed and packed. The packing is carried out by a movable roof of the enclosure, which enclosure may be mounted on a wheeled frame for mobility. Hay is fed into the enclosure through at least one trough provided in the bed of the enclosure. Preferably, a plurality of troughs are provided in the bed; the troughs alternately receiving hay from a feeding device which forces the hay into the enclosure. Stop fingers prevent hay from falling back into the troughs from the enclosure. Wall sections of the enclosure open and the bed tilts for discharging a stack of hay from the enclosure.

14 Claims, 8 Drawing Figures

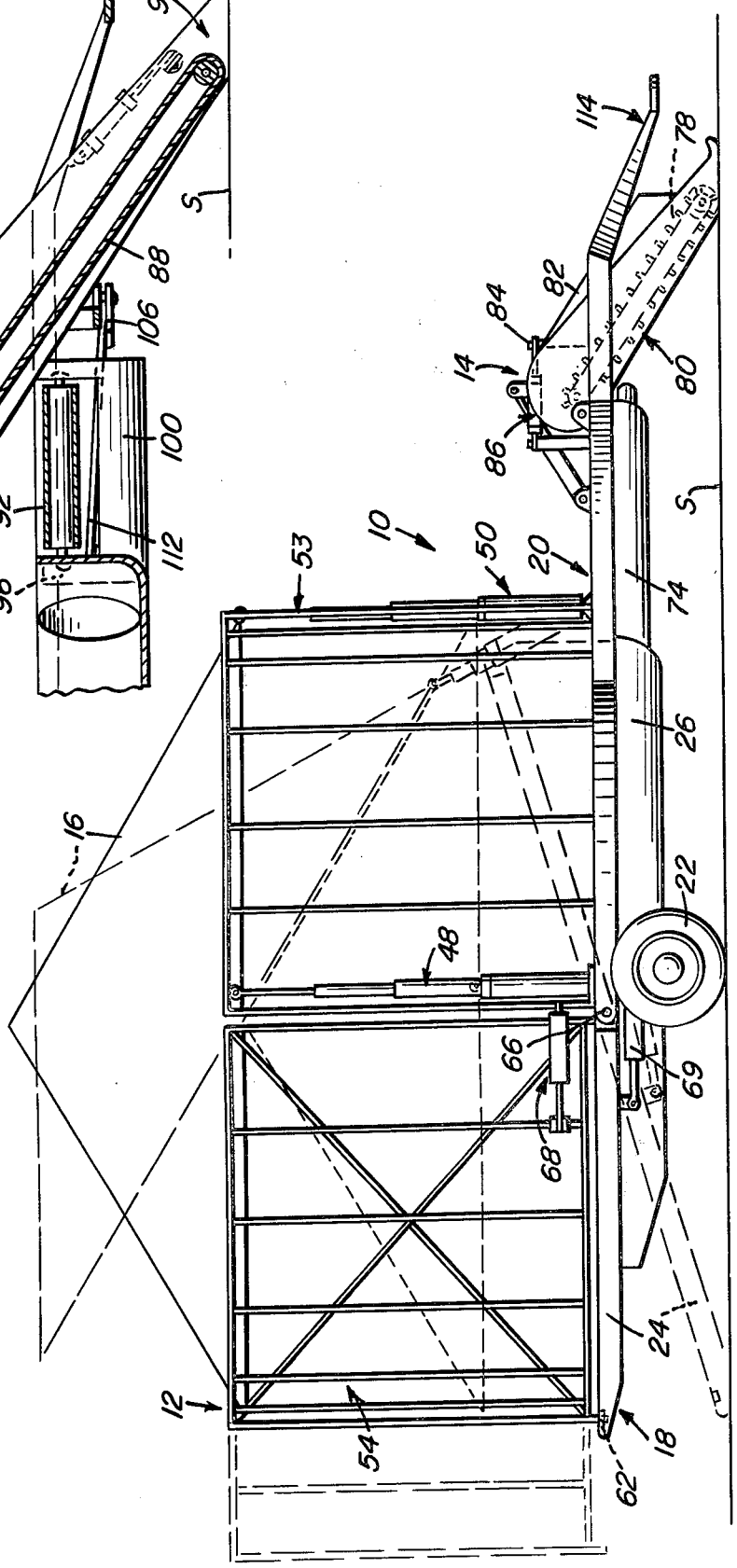
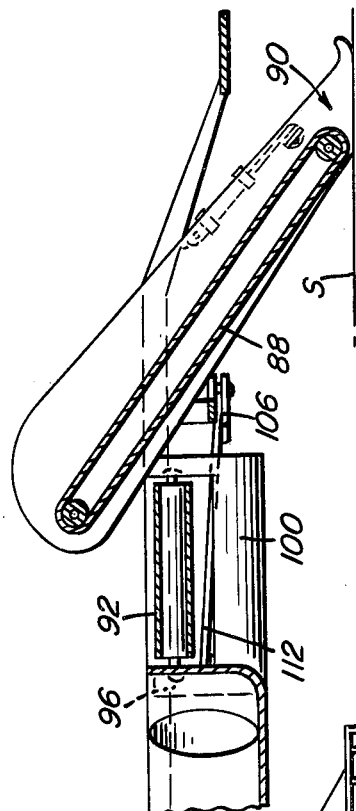

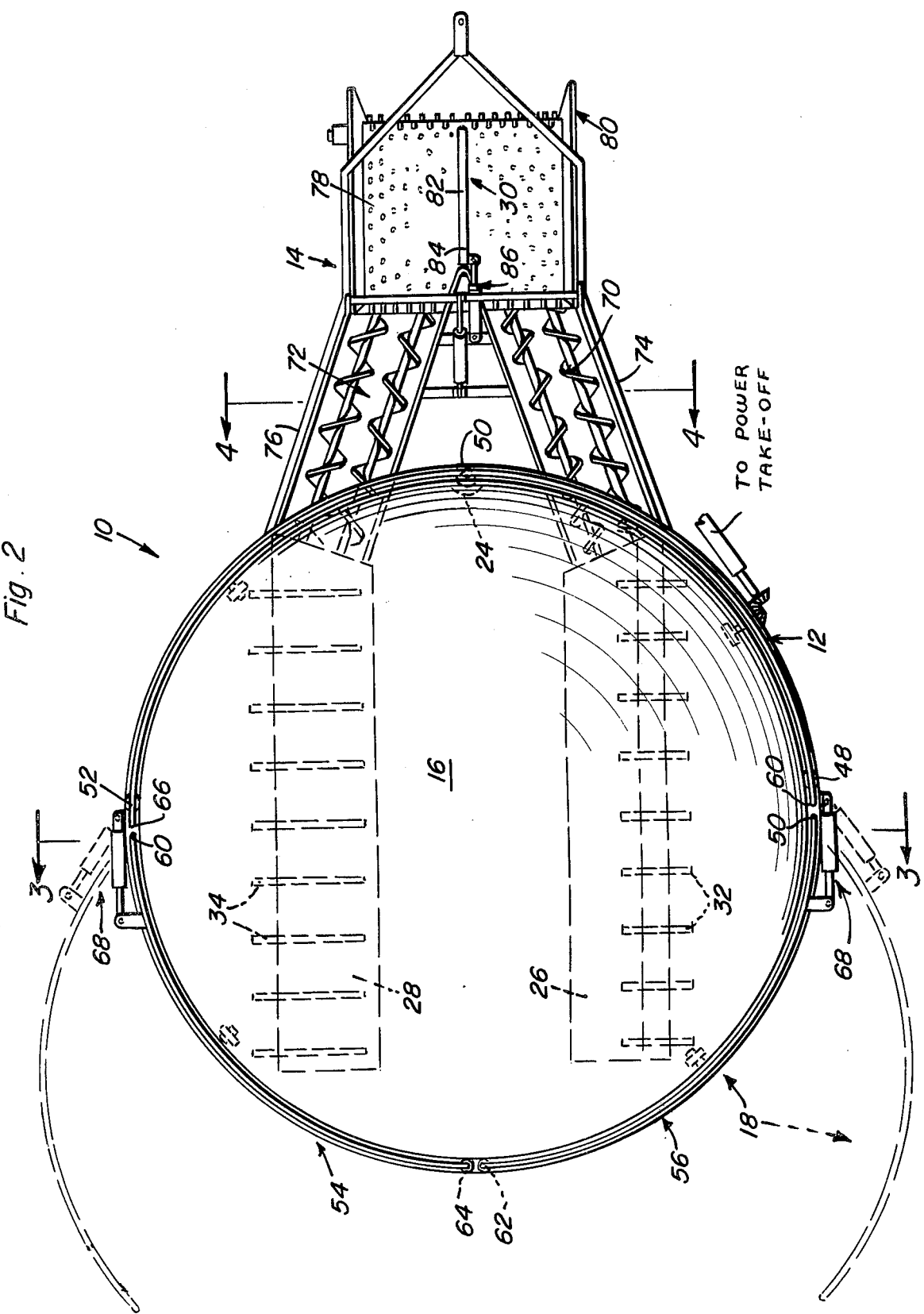

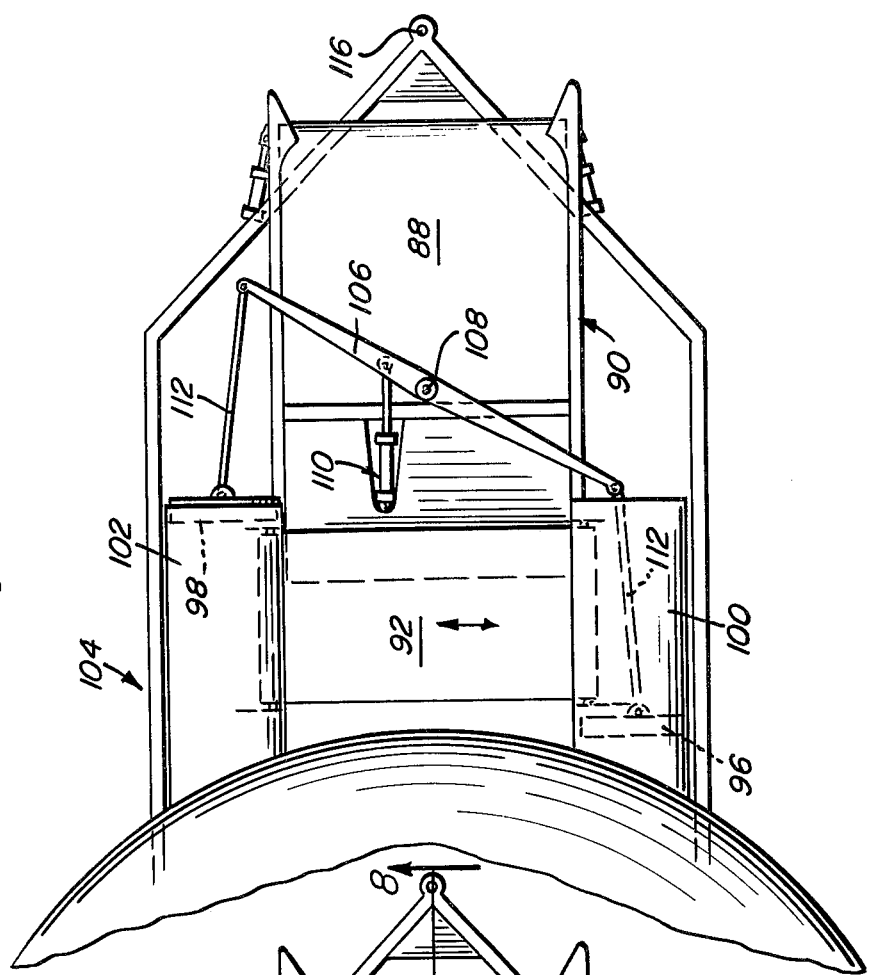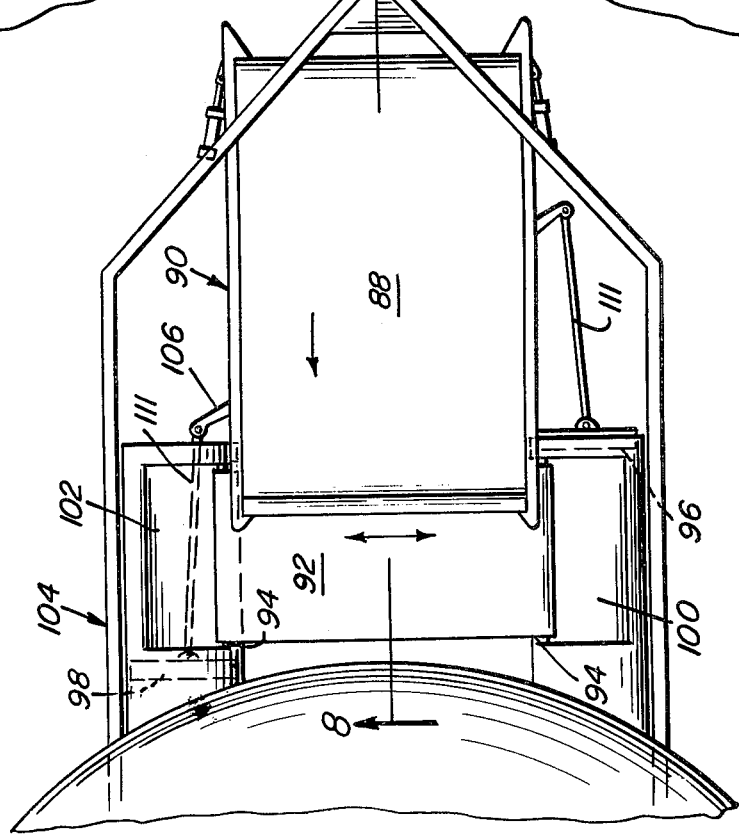

HAYSTACKER

BACKGROUND OF THE INVENTION

1. Field of the Invention

This invention relates generally to a haystacker, and particularly to a mobile haystacking machine which will pick mowed hay from a field and pack the hay to a predetermined tension prior to unloading the hay.

2. Description of the Prior Art

U.S. Pat. No. 3,720,052, issued Mar. 13, 1973 to J. A. Anderson et al, discloses a haystacking assembly which picks up loose hay from a window and elevates the hay to a position above a rotating platform and drops the hay onto the platform for distribution by same.

SUMMARY OF THE INVENTION

It is an object of the present invention to provide an improved haystacker capable of reliably and efficiently mechanizing the haystacking operation.

It is another object of the present invention to provide a haystacker which will uniformly pack the hay, and the like, as same is being stacked.

It is still another object of the present invention to provide a haystacker which permits simple and efficient discharge of a stack of hay.

These and other objects are achieved according to the present invention by providing a haystacker having: an enclosure; a feeding device arranged for pushing hay into the enclosure; a packing member associated with the enclosure for packing hay in the enclosure to a predetermined tension; and an unloading arrangement for removing packed hay from the enclosure.

A preferred embodiment of an enclosure according to the present invention has a bed provided with at least one, and preferably two or more, troughs forming part of the feeding arrangement. If two or more troughs are provided in the enclosure bed, the feeding means will further include a diverter arranged for alternately forcing hay into the respective troughs. Regardless of the number of troughs employed, the feed means includes a set of pivotally mounted stop fingers for each trough. These fingers are arranged for being pivoted away from the associated trough when hay is being diverted to the other, or another, trough for preventing the hay from falling back into the trough. The force of the hay being fed into the troughs causes the hay to be pushed up into the enclosure.

The packer member is advantageously a cone-shaped cover forming a roof for the enclosure. This cover, or roof, is movably mounted on side walls of the enclosure, and is positioned by suitable motors, and the like.

Stacked hay is advantageously unloaded from the enclosure by opening hinged side wall sections of the enclosure and tilting the enclosure bed in a direction such that the bed tilts downwardly toward the open wall sections.

One preferred embodiment of a diverter associated with the feeding arrangement includes auger units arranged for feeding hay to associated troughs. A moving apron is arranged feeding hay to the auger units, and a pivotally mounted switch member is arranged for sweeping across the apron and alternately diverting hay to the auger units.

Another preferred embodiment of a diverter according to the present invention includes a moving apron, an endless conveyor arranged transversely of the moving apron for receiving hay therefrom, and a pair of piston and cylinder assemblies arranged adjacent ends of the endless conveyor. Each trough provided in the enclosure bed has a respective piston and cylinder assembly associated with it, and each of these assemblies is arranged for intermittently receiving hay from the endless conveyor, which is sequentially reversible in operation, and forcing the hay into the trough associated with the piston and cylinder assembly.

The enclosure, feeding arrangement, packer member, and unloading arrangement are all advantageously mounted on a wheeled frame which affords mobility to the haystacker.

Although the material being stacked in a device according to the present invention will be referred to hereinafter in the specification and in the claims as "hay," it is to be understood that this term is intended to apply to any suitable material which may be processed according to the present invention.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a partly schematic, side elevational view showing a haystacker according to the present invention.

FIG. 2 is a partly schematic, top plan view showing the haystacker of FIG. 1.

FIG. 6 is a fragmentary, top plan view showing a modified embodiment of a haystacker according to the present invention.

FIG. 7 is a fragmentary, bottom plan view showing the modified haystacker of FIG. 6.

FIG. 8 is a fragmentary, vertical longitudinal sectional view showing the modified structure of FIGS. 6 and 7.

DESCRIPTION OF THE PREFERRED EMBODIMENTS

Figure 3:
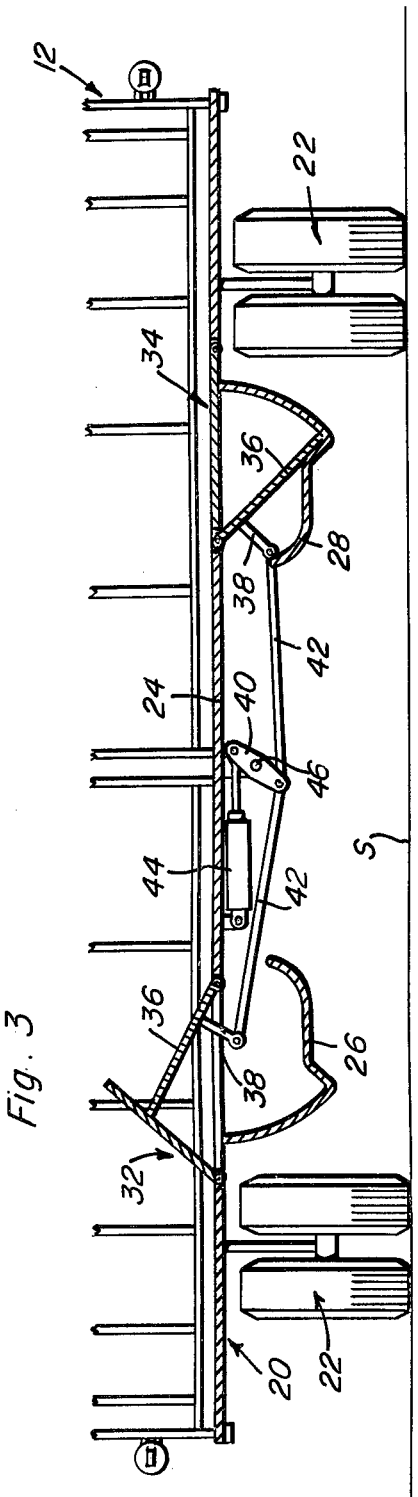
FIG. 3 is a fragmentary, sectional view taken generally along the line 3—3 of FIG. 2.

Referring now more particularly to FIGS. 1 to 5 of the drawings, a haystacker 10 according to the present invention has an enclosure 12 and a feeding arrangement 14 for pushing hay into enclosure 12. A packer member in the form of a roof, or dome, 16 is associated with enclosure 12 for packing hay in enclosure 12 to a predetermined tension, while an unloading arrangement 18 facilitates removal of packed hay from the enclosure 12. A frame 20, advantageously provided with wheels 22 in a conventional manner, movably supports enclosure 12, arrangement 14, roof 16, and arrangement 18.

Enclosure 12 is provided with a floor or bed 24 in which is provided for example, a pair of troughs 26 and 28 arranged opening into enclosure 12. Although a pair of troughs 26, 28 is illustrated in the drawings, it is to be understood that other numbers of troughs may be employed as indicated or made desirable by a specific situation. Troughs 26 and 28 partially form feeding arrangement 14. Also included in arrangement 14 is a diverting arrangement 30 which alternately forces hay into troughs 26 and 28. Preferred embodiments of arrangement 30 will be described below.

As can best be seen from FIG. 3 of the drawings, feed arrangement 14 includes, for example, two sets of pivotally mounted stop fingers. These sets, designated 32 and 34 in the drawings, are each associated with a respective trough 26 and 28, and are arranged for being pivoted away from the associated troughs when hay is being diverted to that trough. The stop fingers cover the troughs when hay is being diverted into the other of the troughs for preventing the hay from falling back into the trough being covered. The action of the diverting arrangement 30 creates a force sufficient to push hay out of the troughs and into enclosure 12.

Each stop finger included in sets 32 and 34 has a pivotally mounted flap 36 provided with a projection 38 extending toward the associated trough. A rocker 40 is suspended from, for example, bed 24 in a conventional manner, and has connected to one crank arm thereof connecting rods 42 extending to each of the troughs. The ends of connecting rods 42 spaced from rocker 40 are pivotally connected to the projections 38 of the associated flaps 36. The connection of rods 42 to rocker 40 is also advantageously a pivotal connection. A conventional fluid motor 44, which may be a standard hydraulic linear motor, is also suspended beneath bed 24 with the free end of the pistons thereof connected to the crank arm of rocker 40 opposed to the crank arm to which connecting rods 42 are connected. A pivotal mounting of rocker 40 at pivot 46 permits motor 44 to pivot, or rock, rocker 40 about pivot 46 and alternately move flaps 36 between open and closed positions of stop fingers associated with the flaps. Specifically, pivotal movement of rocker 40 will swing flaps 36 into and out of engagement with the stop fingers. Swinging flaps 36 associated with trough 26 out of that trough causes the free ends of the flaps to engage the stop fingers of set 32 and to swing the stop fingers away from the opening of trough 26 at bed 24. Reversely, swinging flaps 36 down into trough 28 will permit the stop fingers of set 34 to fall under their own weight into a position covering the opening of trough 28 at bed 24. This is the position of the stop fingers and associated elements as shown in FIG. 3 of the drawings. Movement of rocker 40 to its other extreme position will cause a reverse orientation of the stop fingers, which can readily be appreciated from the above description and from the drawings. As can be seen from FIG. 2 of the drawings, the stop fingers, and accordingly their associated flaps, are in the form of slats which only cover a relatively small portion of the openings of the troughs 26 and 28. As can be appreciated, the individual flaps 36 are hidden in FIG. 2 of the drawings by their associated stop fingers forming the sets 32 and 34.

Referring again to FIGS. 1 and 2 of the drawings, roof 16 is formed by a cone-shaped cover movably mounted on enclosure 12. This movable mounting may be achieved in a manner not shown by guiding peripheral portions of roof 16 in slotted ones of the posts forming the side wall of enclosure 12. A plurality of, for example, conventional linear fluid motors, motors 48, 50, and 52 being illustrated, are advantageously provided for moving roof 16 to a desired position. These motors are attached to frame 20 at one end and to a peripheral portion of roof 16 at their other end. The connection to roof 16, at least, should be a pivotal connection, and may be achieved as by the illustrated lugs.

The roof 16 is advantageously arranged in its own framework where the packer would travel inside U-shaped channel providing four different equally divided bearing points. Three bearings will be arranged at each point. One of these bearings will be arranged on top, one on the bottom, and one on the end of an associated channel, and travel inside the U-shaped channel while the roof is packing hay. The bearings may be powered by a conventional gear box (not shown) arranged attached to either the right or left side of frame 20. Lugs (not shown), and the like, up to, for example, two inches in depth, may be installed on the underside of the roof 16 for aiding in the distribution of moving hay to the middle of the resulting stack and making a more uniformly finished product.

As mentioned above, enclosure 12 includes, for example, a circular wall 53 formed by a plurality of posts arranged around, and outside of, bed 24. The posts are connected together at the upper end of wall 53 in a plurality of sections for a purpose to be described below.

Unloading arrangement 18 includes a pair of adjacent, pivotally mounted sections 54 and 56 of the circular wall 53. These sections, which are advantageously pivotally mounted in pivots 58 and 60 provided in bed 24, swing toward and away from one another for opening and closing wall 53. That is, sections 54, 56 open and close in a manner similar to a conventional double door. Sockets 62 and 64 are provided in bed 24 for receiving projecting portions of sections 54 and 56 and locking same in a wall closed position. Bed 24 is pivotally mounted to frame 20 as by a pair of trunnion-like pivots 66 which permit bed 24 to pivot in the direction of sections 54 and 56 when same are swung away from one another to open wall 53 and dump packed hay from enclosure 12. That is, bed 24 will tilt in the manner shown by the broken lines in FIG. 1 of the drawings. It will be appreciated that since troughs 26 and 28 are connected to bed 24, the troughs will pivot with the floor. Fluid motors 68 are associated with the sections 54 and 56 and permit selective opening and closing of same in a known manner, while a fluid motor 69 permits positioning of bed 24. In practice, this positioning of bed 24 will be between the normal full line position shown in FIG. 1 of the drawings and the tilted broken line position therein. Alternatively, frame 20 could be hinged just forwardly of enclosure 12, or toward the hitch, in a conventional manner not shown, and the bed, enclosure, and associated trough portion tilted as a unit to discharge the hay.

It is to be understood that rocker 40 may be arranged in a neutral, or half-way, position (not shown) which permits both sets 32 and 34 of the stop fingers to drop down to a trough covering position. This will facilitate the unloading of the hay from bed 24. An arcuate bar (not shown) provided with legs to form a double-T may be arranged on bed 24 so as to extend about twothirds around the front, fixed portion of wall 53 and slide over the lowered stop fingers. A pair of chains (not shown) would be attached to ends of the bar for dragging same across bed 24 and providing a power push-off for the stacked material. The stop fingers may bend a little at their tip as the hay slips past the fingers.

Figure 4:
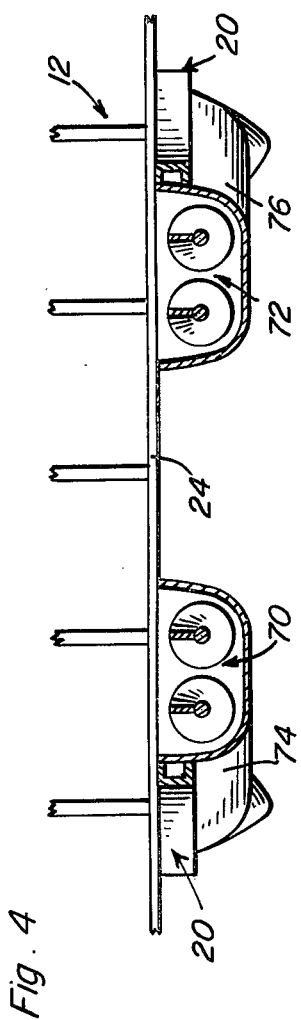
FIG. 4 is a fragmentary, sectional view taken generally along the line 4—4 of FIG. 2.
Figure 5:
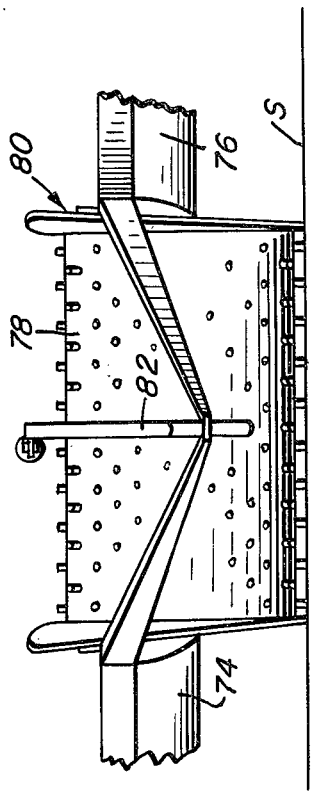
FIG. 5 is a fragmentary, front elevational view showing the haystacker of FIGS. 1 to 4.

As best seen in FIGS. 1, 4, and 5 of the drawings, feed arrangement 14 for haystacker 10 includes auger pairs 70 and 72 arranged for feeding hay to respective troughs 26 and 28. These auger pairs 70, 72 are arranged in respective housings 74 and 76 attached to frame 20 and forming the break point with the troughs when the bed 24 is tilted to its unloading position. An apron 78 in the form of a conventional belt conveyor mounted on a supporting structure 80 is arranged feeding hay to auger pairs 70, 72. A pivotally mounted switch member 82 is arranged for sweeping about a pivot 84 and across apron 78 for alternately diverting hay to auger pairs 70, 72. For example, a fluid motor 86, which may be a hydraulic motor and similar to the motors described above, is arranged in a conventional manner for actuating member 82 to sweep at a predetermined rate which will, in conjunction with the speed of apron 78, alternately and sequentially force hay into auger pairs 70, 72, and ultimately through the troughs 26, 28 associated with the auger pairs and into enclosure 12.

FIGS. 6 to 8 of the drawings show a modified feed arrangement for a haystacker according to the present invention. This modified feed arrangement includes a moving apron 88, which may be similar to apron 78 and mounted on a conventional supporting structure 90, and an endless conveyor 92, of conventional construction and mounted for rotation about a pair of spaced rollers 94, is arranged transversely of apron 88 and below same for receiving hay therefrom. A pair of piston and cylinder assemblies constructed from pistons 96 and 98 and respective cylinders 100 and 102 are associated with each trough and are arranged adjacent the ends of conveyor 92 for alternately receiving hay therefrom. In effect, the piston and cylinder assemblies replace the auger pairs of feed arrangement 14. The cylinders are mounted on a frame 104 in a conventional manner, and are provided with openings for receiving hay discharged from the associated end of conveyor 92. The pistons 96, 98 are connected to respective ends of a beam 106, pivotally mounted to the frame as at pivot 108 and rocked from one position to another as by a conventional fluid motor 110, and the like, having the free end of its piston rod connected to one crank arm of beam 106, the connection of pistons 96, 98 to beam 106 being effected in a conventional manner by suitable connecting rods 112.

Once hay has been fed up apron 88 and dumped onto conveyor 92, the hay will be alternately and sequentially feed to either cylinder 100 or 102. The piston associated with the cylinder to which hay is being fed at any one time will be in the position of piston 96 in FIG. 6 of the drawings. Once a predetermined charge of hay has been dumped into cylinder 100, 102, through the opening associated therewith, the piston cooperating with that cylinder will be moved forward by appropriate movement of beam 106 and the hay will be forced into the trough and up through bed 24 into enclosure 12. While this forward movement of the piston is taking place, the direction of conveyor 92 will have been reversed in a suitable manner, not shown, such as by limit switches, and the like, and hay will be discharged into the other of the cylinders.

Both embodiments of a haystacker according to the present invention are provided with suitable hitches 114 and 116 at the forward end of the vehicle frame for permitting the frame to be trailed behind any suitable towing vehicle (not shown).

As can be readily understood from the above description and from the drawings, both illustrated embodiments of a haystacker according to the present invention cause the hay to be forced upwardly through the floor or bed of the packing enclosure. The position of the roof of the enclosure may be controlled during the time hay is being forced into the enclosure so as to place a predetermined tension on the stacked hay. Once a predetermined stack of hay is present in the enclosure, the cover may be tilted to the broken line position in FIG. 1 of the drawings, the sections of the side wall of the enclosure opened, and the bed tilted to its broken line position in FIG. 1 to cause unloading or dumping of the stacked hay.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A haystacker, comprising, in combination:
   a. an enclosure;
   b. feed means for pushing hay into the enclosure; and
   c. packer means associated with the enclosure for packing hay in the enclosure to a predetermined tension, the enclosure having a bed, and the feed means includes a trough provided in the bed and arranged opening into the enclosure, and further including unloading means for removing packed hay from the enclosure, the feed means having a plurality of troughs provided in the bed and arranged opening into the enclosure, and further including diverter means for alternately forcing hay into the troughs.

2. A structure as defined in claim 1, wherein the feed means further includes a plurality of sets of stop fingers pivotally mounted on the bed associated with the troughs, each of the sets arranged for being pivoted away from the trough associated therewith when hay is being diverted to the associated trough, and for covering the trough when hay is being diverted into the other of the troughs for preventing the hay from falling back into the associated trough, the action of the diverter means pushing hay out of the trough into the enclosure.

3. A structure as defined in claim 2, wherein the packer means includes a cone-shaped cover forming a roof for the enclosure, and arranged movably mounted on the enclosure, a plurality of linear fluid motors, each of the motors connecting a periphery of the cover to a periphery of the enclosure bed for positioning the cover relative to the bed.

4. A structure as defined in claim 3, further including a wheeled frame, and wherein the enclosure, feed means, packer means, and unloading means are all mounted on the wheeled frame.

5. A structure as defined in claim 4, wherein the enclosure includes a side wall mounted on the frame and arranged surrounding, and outside of the bed, and the unloading means includes a pair of adjacent, pivotally mounted sections of the side wall, the sections arranged for swinging toward and away from one another, and a pivotal mounting of the bed of the enclosure to the frame for permitting the bed to tilt downwardly toward the sections when same are swung away from one another and dump packed hay from the enclosure.

6. A structure as defined in claim 5, wherein the diverter means includes mounted on the frame a pair of auger units arranged for feeding hay to a respective pair of troughs, an apron in the form of a belt conveyor arranged feeding hay to the auger units, and a pivotally mounted switch member arranged for sweeping across the apron and alternately diverting hay to the auger units.

7. A structure as defined in claim 5, wherein the diverter means includes mounted on the frame a moving apron, an endless conveyor arranged transversely of the moving apron for receiving hay therefrom, and a pair of piston and cylinder assemblies and a respective pair of troughs, each trough having a respective one of the piston and cylinder assemblies associated therewith, and each of the assemblies arranged for intermittently receiving hay from the endless conveyor and force the hay into the associated trough, the endless conveyor being arranged for reverse movement to sequentially feed the piston and cylinder assemblies.

8. A haystacker, comprising, in combination:
 a. an enclosure;
 b. feed means for pushing hay into the enclosure; and
 c. packer means associated with the enclosure for packing hay in the enclosure to a predetermined tension, the enclosure including a bed, and the feed means having a plurality of troughs provided in the bed of the enclosure and arranged opening into the enclosure, and further including diverter means for sequentially forcing hay into the troughs.

9. A structure as defined in claim 8, wherein the diverter means includes a pair of auger units arranged for feeding hay to a respective pair of the troughs, an apron in the form of a belt conveyor arranged feeding hay to the auger units, and a pivotally mounted switch member arranged for sweeping across the apron and alternately diverting hay to the auger units.

10. A structure as defined in claim 8, wherein the diverter means includes a moving apron, an endless conveyor arranged transversely of the moving apron for receiving hay therefrom, and a pair of piston and cylinder assemblies, each of a pair of the troughs having a respective one of the assemblies assoicated therewith, and each of the assemblies arranged for intermittently receiving hay from the endless conveyor and forcing it into the associated trough, the endless conveyor being arranged for reversible movement so as to alternately feed hay to the piston and cylinder assemblies.

11. A haystacker, comprising, in combination:
 a. an enclosure;
 b. feed means for pushing hay into the enclosure; and
 c. packer means associated with the enclosure for packing hay in the enclosure to a predetermined tension, the feed means including at least one trough provided in a bed of the enclosure and arranged opening into the enclosure, and a set of pivotally mounted stop fingers associated with the trough and arranged for being pivoted away from the trough when hay is being diverted thereto, and for covering the trough when hay is being diverted elsewhere for preventing the hay from falling back into the trough, the action of the diverter means pushing hay cut of the trough into the enclosure.

12. A structure as defined in claim 1, wherein the packer means includes a plurality of linear fluid motors, and a cone-shaped cover forming a roof for the enclosure, and arranged movably mounted on the enclosure for positioning by the plurality of linear fluid motors, each of the motors connecting a periphery of the cover to a periphery of the enclosure bed.

13. A structure as defined in claim 1, further including a wheeled frame, and wherein the enclosure, feed means, packer means, and unloading means are all mounted on the frame.

14. A structure as defined in claim 1, wherein the enclosure includes a bed and a side wall arranged about the periphery of the bed, and the unloading means includes a pair of adjacent, pivotally mounted sections of the side wall, the sections arranged for swinging toward and away from one another, a frame and a pivotal mounting of the bed of the enclosure to the frame for permitting the bed to tilt downwardly toward the sections when same are swung away from one another and dump packed hay from the enclosure.

* * * * *